United States Patent

Kuroda

[11] Patent Number: 5,845,366
[45] Date of Patent: Dec. 8, 1998

[54] HINGE STRUCTURE FOR PORTABLE TYPE ELECTRONIC EQUIPMENT

[75] Inventor: Mitsuru Kuroda, Shizuoka, Japan

[73] Assignee: NEC Corporation, Tokyo, Japan

[21] Appl. No.: 895,035

[22] Filed: Jul. 16, 1997

[30] Foreign Application Priority Data

Jul. 26, 1996 [JP] Japan ................... 8-197519

[51] Int. Cl.⁶ .................. E05D 7/10; E05D 3/06
[52] U.S. Cl. .................. 16/229; 16/366; 16/266; 16/255
[58] Field of Search ............... 16/229, 230, 231, 16/366, 254, 258, 262, 263, 265, 266, 225

[56] References Cited

U.S. PATENT DOCUMENTS

| | | | |
|---|---|---|---|
| 464,201 | 12/1891 | Rowland | 16/229 |
| 1,904,110 | 4/1933 | Willmann | 16/229 |
| 3,924,293 | 12/1975 | Cain | 16/230 |
| 4,684,017 | 8/1987 | Watanabe et al. | 16/366 |
| 4,729,134 | 3/1988 | Hillebrand et al. | 16/271 |
| 5,737,183 | 4/1998 | Kobayashi et al. | 16/366 |

FOREIGN PATENT DOCUMENTS 5-79982 10/1993 Japan .
5-85078 11/1993 Japan .

*Primary Examiner*—Chuck Y. Mah
*Attorney, Agent, or Firm*—Young & Thompson

[57] ABSTRACT

A hinge structure for a portable type electronic equipment connects a protection cover which protects a tablet type display and a substantially rectangular parallelepiped case which serves as an equipment main body with each other. This hinge structure includes a substantially cylindrical trunk portion, a pair of joint portions, a pair of first shaft projections, and two pairs of second shaft projections. The trunk portion has a predetermined length. The pair of joint portions are integrally formed on two ends of the trunk portion and project from said two ends of the trunk portion for a predetermined length in one direction perpendicular to an axis of the trunk portion so as to form a bracket together with the trunk portion. The pair of first shaft projections project from proximal-side end faces, near the trunk portion, of the pair of joint portions for a predetermined length outward in an axial direction of the trunk portion so as to fit in the protection cover. The two pairs of second shaft projections project from distal-side end faces of the pair of joint portions for a predetermined length in a direction parallel to the axis of the trunk portion so as to fit in the case.

7 Claims, 6 Drawing Sheets

HINGE STRUCTURE FOR PORTABLE TYPE ELECTRONIC EQUIPMENT

BACKGROUND OF THE INVENTION

1. Field of the Invention

The present invention relates to a hinge structure for a portable type electronic equipment.

2. Description of the Prior Art

Figure 1A:
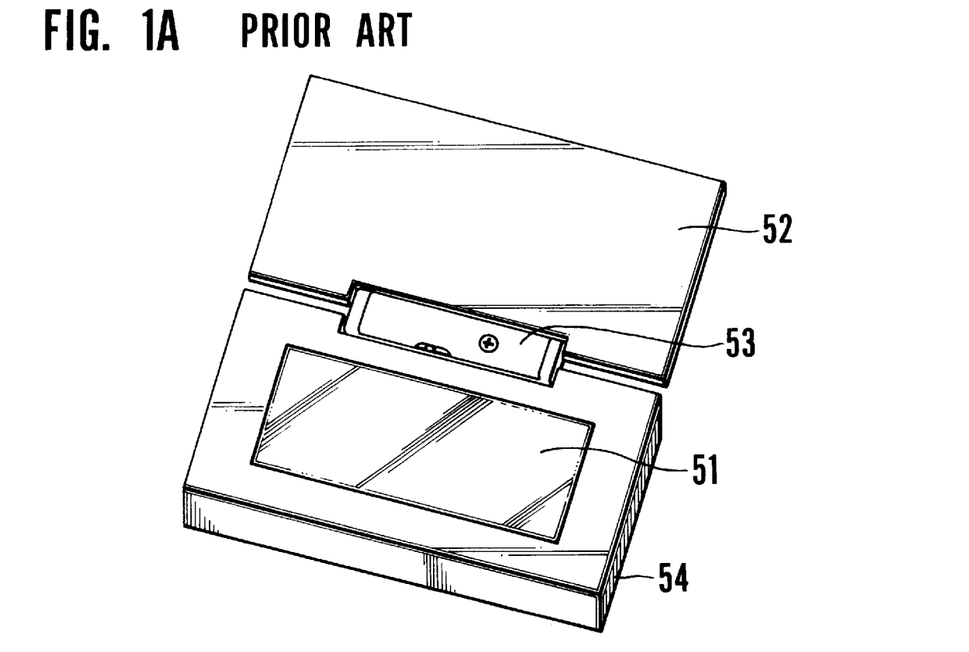
FIG. 1A is a perspective view showing an example of the hinge structure.
Figure 1B:
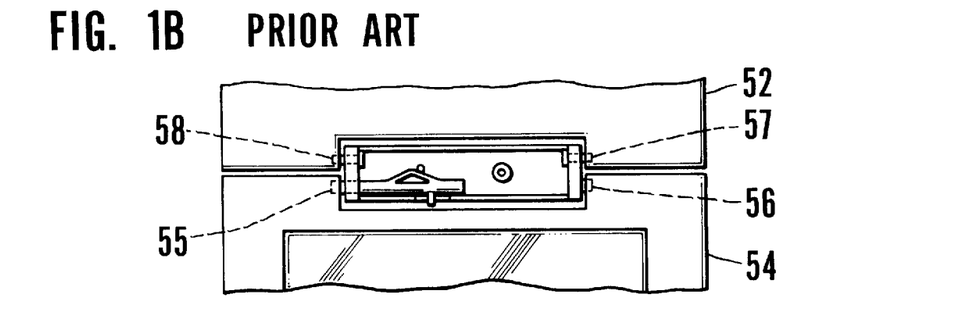
FIG. 1B is a partial plan view showing a state wherein the hinge cover is removed.
Figure 1C:
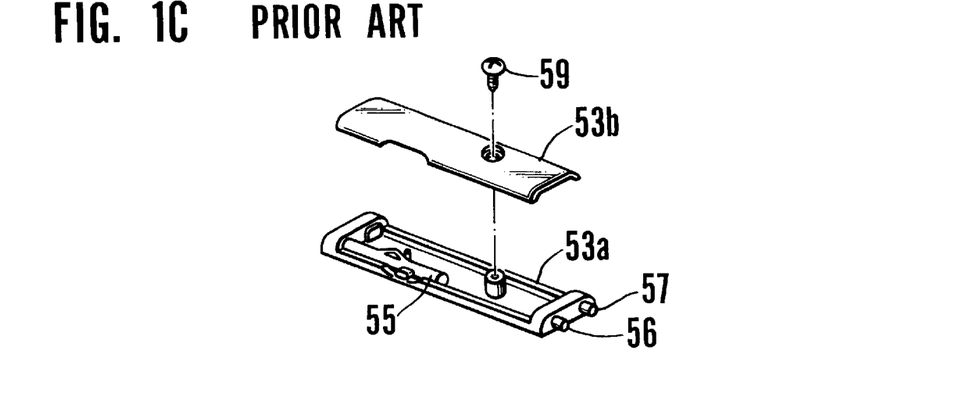
FIG. 1C is an exploded perspective view of the hinge portion.

FIG. 1A is a perspective view showing an example of a hinge structure for a conventional portable type electronic equipment, FIG. 1B is a partial plan view of the hinge portion of FIG. 1A from which the hinge cover is removed, and FIG. 1C is an exploded perspective view of the hinge portion of FIG. 1A.

Referring to FIGS. 1A to 1C, a conventional portable type electronic equipment having a tablet type display 51 has a protection cover 52 for protecting the display 51, and the protection cover 52 and a case 54 of the unit main body are connected to each other with a hinge portion 53. The protection cover 52 is pivoted to be open as shown in FIG. 1A, and information is input.

In order to allow the protection cover 52 to pivot to completely the rear side of the unit main body with a pivot angle of 360°, a pair of shaft projections 56 and 57, and the like respectively formed on the two ends of a flat plate-like hinge case 53a are fitted in a pair of shaft accepting holes formed in the side portions of the case 54 and protection cover 52, so that the protection cover 52 is pivotally connected to the case 54 with two shafts.

As shown in FIG. 1C, the hinge portion 53 is vertically divided in the direction of thickness of its flat plate. At least one of the shaft projections at the two ends of the hinge case 53a that fit in the case 54 constitutes a slide shaft 55 which is a separate component. The other shaft projection 56 integrated with the hinge case 53a is fitted in the shaft accepting hole of the case 54. Thereafter, the slide shaft 55 is slid to connect the protection cover 52 and case 54 with each other.

Afterwards, the shaft projection 57 which is separate from the protection cover 52, and a shaft projection 58 are pressed into the shaft accepting holes of the protection cover 52 to be connected to the protection cover 52, and then a hinge cover 53b is built on the hinge case 53a and fastened by a screw 59.

Figure 2A:
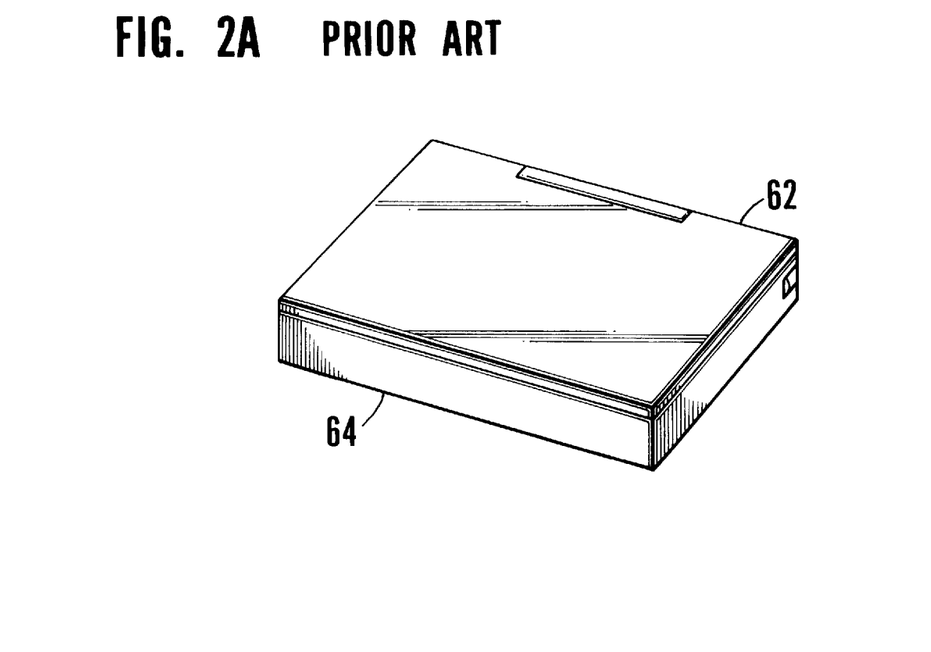
FIG. 2A is a perspective view showing a portable type electronic equipment in a carrying state.
Figure 2B:
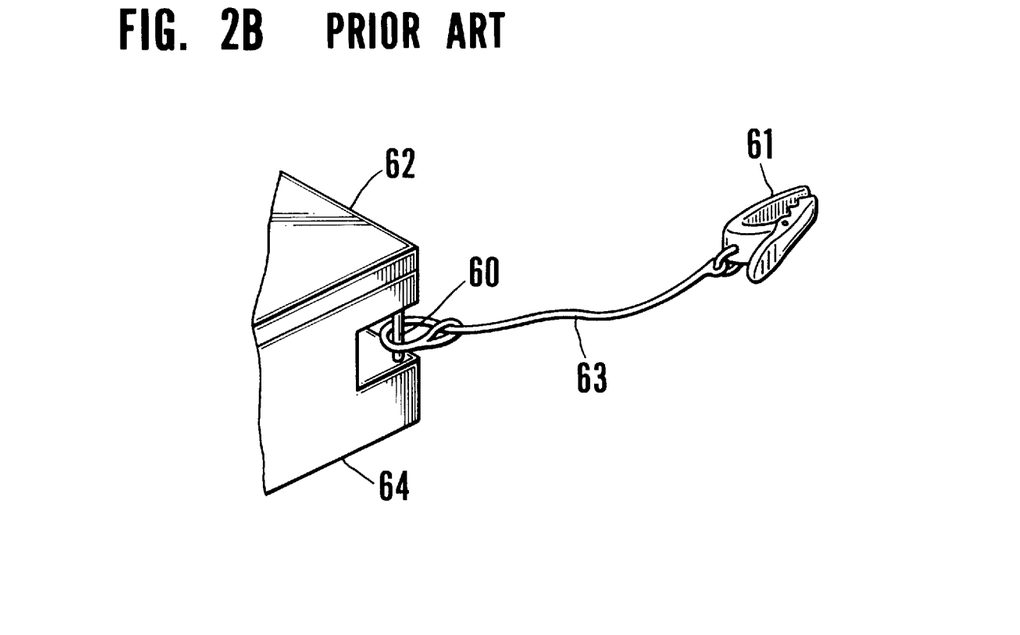
FIG. 2B is a partial enlarged view showing an example of the carrying means.

FIG. 2A is a perspective view showing the carried state of the conventional portable type electronic equipment, and FIG. 2B is a partial enlarged view of an example of the carrying means of FIG. 2A.

When the conventional portable type electronic equipment is to be carried, its protection cover 62 is closed, as shown in FIG. 2A. As an example of the carrying means, a pin 60 is formed on the corner portion of a case 64, and a strap (or chain) 63 having a clip 61 at its distal end is extended through the pin 60, as shown in FIG. 2B. The case 64 is put in the pocket of the clothing, and the clip 61 is caught by the pocket.

"Cover Opening/Closing Mechanism for Compact Electronic Equipment" described in Japanese Unexamined Utility Model Publication No. 5-79982 and "Hinge Mechanism for Electronic Equipment" described in Japanese Unexamined Utility Model Publication No. 5-85078 can be taken as the second and third conventional examples of the technique of this type.

In the second conventional example, a first elastic locking member which is constantly in elastic contact with the outer circumferential surface of the lower portion of the hinge member is arranged in a main body case, and a second elastic locking member which is constantly in elastic contact with the outer circumferential surface of the upper portion of the hinge member is arranged in the cover case. The hinge member is formed with first and second engaging projections. When the cover case is closed, the first engaging projection elastically engages with the abutment roller of the first elastic locking member to lock the hinge member, and the second engaging projection elastically engages with the abutment roller of the second elastic locking member to lock the hinge member. Hence, a cover opening/closing mechanism which enables an easy opening/closing operation and has a good outer appearance is obtained.

In the third conventional example, the slide portion of a ratchet piece is slidably arranged in a mounting hole formed in the mounting portion of the main body case. A connection shaft is inserted in the second shaft hole of the ratchet piece and the first shaft hole formed in the connecting portion of the cover case to pivotally connect the cover case to the main body case. A leaf spring is arranged between the mounting portion and the ratchet piece. The ratchet piece is elastically urged against the connecting portion of the cover case with this leaf spring, so that the second meshing groove of the ratchet piece meshes with the first meshing groove of the connecting portion. In accordance with the pivot operation of the cover case, meshing of the first and second meshing grooves is sequentially shifted, so that the ratchet piece and the cover case always mesh with each other. Therefore, the cover case cannot be easily removed from the main body case, and the cover case can be fixed at an arbitrary position in the pivot movement.

In the first conventional example, the protection cover and the hinge mechanism portion are undetachably connected to each other. Even when the protection cover is damaged or the user wishes to change the protection cover so that the unit design has variations, the protection cover cannot be exchanged.

Since the hinge does not have a stable frictional resistance when pivoting the protection cover, and the unit does not have a locking means which performs locking at a predetermined hinge pivot angle, even a light touch by the user or an external light vibration applied to the unit may rotate the hinge, impairing the product value.

Since the hinge portion has the shape of a substantially flat plate, when reducing the parts mounting space, the pivot region of the hinge portion must be formed by notching the case of the unit main body.

As the carrying means, a clipped strap is attached to the case so that the electronic equipment can be put in the pocket or be mounted on the user's waist belt. Since the system notebook itself does not have a mounting/detaching means, the electronic equipment cannot be carried around integrally with the system notebook, or the system notebook and the electronic equipment cannot be used to be linked to each other.

The arrangement and structure of the second and third conventional examples are completely different from those of the present invention.

SUMMARY OF THE INVENTION

The present invention has been made in view of the above situation of the conventional technique, and has as its object to provide a hinge structure for a portable type electronic equipment in which the case mounting efficiency and the product value of the portable type electronic equipment are remarkably improved.

In order to achieve the above object, according to the basic aspect of the present invention, there is provided a hinge structure for a portable type electronic equipment, for connecting a protection cover which protects a tablet type display and a substantially rectangular parallelepiped case which serves as an equipment main body with each other, comprising a substantially cylindrical trunk portion having a predetermined length, a pair of joint portions integrally formed on two ends of the trunk portion and projecting from the two ends of the trunk portion for a predetermined length in one direction perpendicular to an axis of the trunk portion so as to form a bracket together with the trunk portion, a pair of first shaft projections projecting from proximal-side end faces, near the trunk portion, of the pair of joint portions for a predetermined length outward in an axial direction of the trunk portion so as to fit in the protection cover, and two pairs of second shaft projections projecting from distal-side end faces of the pair of joint portions for a predetermined length in a direction parallel to the axis of the trunk portion so as to fit in the case.

In the above basic aspect, at least one of the pair of first shaft projections that fit in the protection cover is slidable in an axial direction thereof to be able to project/retract, thereby enabling the protection cover to be mounted on/detached from the case.

In the above basic aspect, at least two outer ones of the two pairs of second shaft projections have projecting portions integrally projecting radially downward, and the projecting portions fit with notches in elastic members fixedly disposed at predetermined portions of the case.

In the above basic aspect, the portable type electronic equipment can be joined with a notebook having binder pawls.

When the portable type electronic equipment is joined with a notebook having binder pawls, a length of the trunk portion between the pair of joint portions and an outer diameter of the trunk portion respectively fit with a length across a plurality of binder pawls of the notebook and an inner size of the binder pawls.

As is apparent from the above aspect, according to the present invention, since the case of the equipment main body need not be notched except for a region where the joint portions pivot, the mounting space in the case is enlarged and utilized effectively.

The elastic members arranged in the accommodating portions of the case that holds the joint portions have notched portions at predetermined positions. The joint portions which come into contact with the elastic members have projections that can fit in the notches of the elastic members. Therefore, the designer can set locking of the hinge pivot angle and a stable frictional resistance during the pivot movement very easily in accordance with the required unit specifications, and degradation in product value caused by the play of the hinge portion can be suppressed completely.

At least one of the shafts that fit with the protection cover of the trunk portion has a slide structure that enables the protection cover to be mounted/detached. Even if the protection cover is damaged, it can be exchanged easily without requiring an extra cost. Therefore, the present invention can cope with demands in product marketing strategy very flexibly and widely.

The length between the joint portions of the hinge and the outer diameter of the trunk portion respectively fit with the length across the plurality of binder pawls of the notebook and the inner size of the binder pawls, thus providing a carrying means that can be mounted on/detached from the notebook. Therefore, possibilities for a new environment where the portable type electronic equipment is used as it is joined with a notebook, and service development can be created.

The above and many other objects, features and advantages of the present invention will become manifest to those skilled in the art upon making reference to the following detailed description and accompanying drawings in which preferred embodiments incorporating the principles of the present invention are shown by way of illustrative example.

BRIEF DESCRIPTION OF THE DRAWINGS

FIGS. 1A to 1C respectively show a conventional example, in which

FIGS. 2A and 2B show another conventional example, in which

FIGS. 3A and 3B show a portable type electronic equipment on which a hinge structure of the present invention is mounted, in which

FIGS. 5A and 5B are partial enlarged views showing a state wherein the embodiment shown in FIG. 4 is mounted on a portable type electronic equipment, in which

FIGS. 7A and 7B show another embodiment of the present invention, in which

DETAILED DESCRIPTION OF PREFERRED EMBODIMENTS

The several preferred embodiments of the present invention will be described with reference to the accompanying drawings.

Figure 3A:
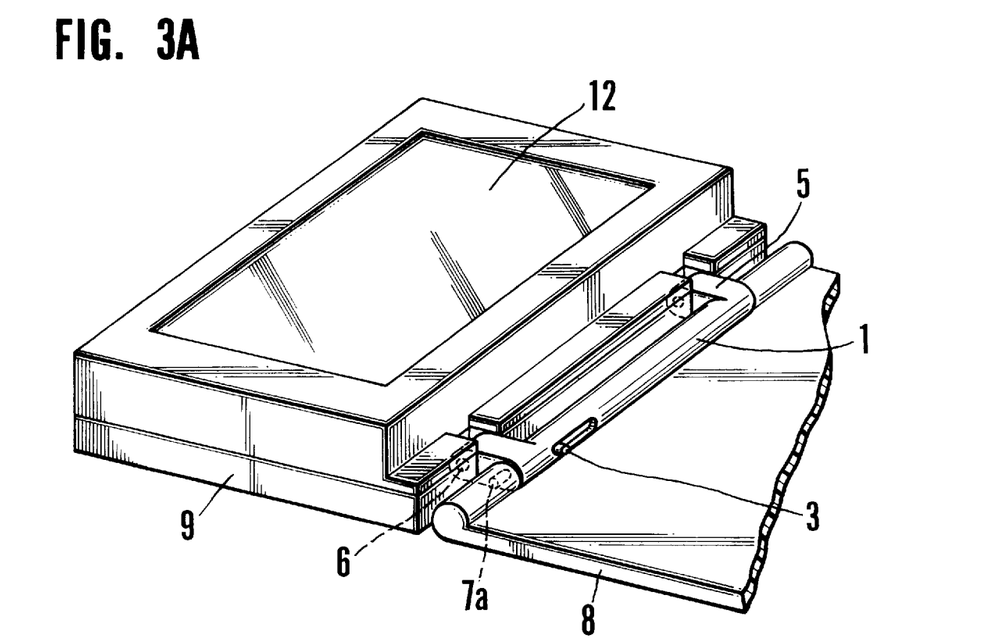
FIG. 3A is a perspective view seen in the direction of the rear portion when the protection cover is open.
Figure 3B:
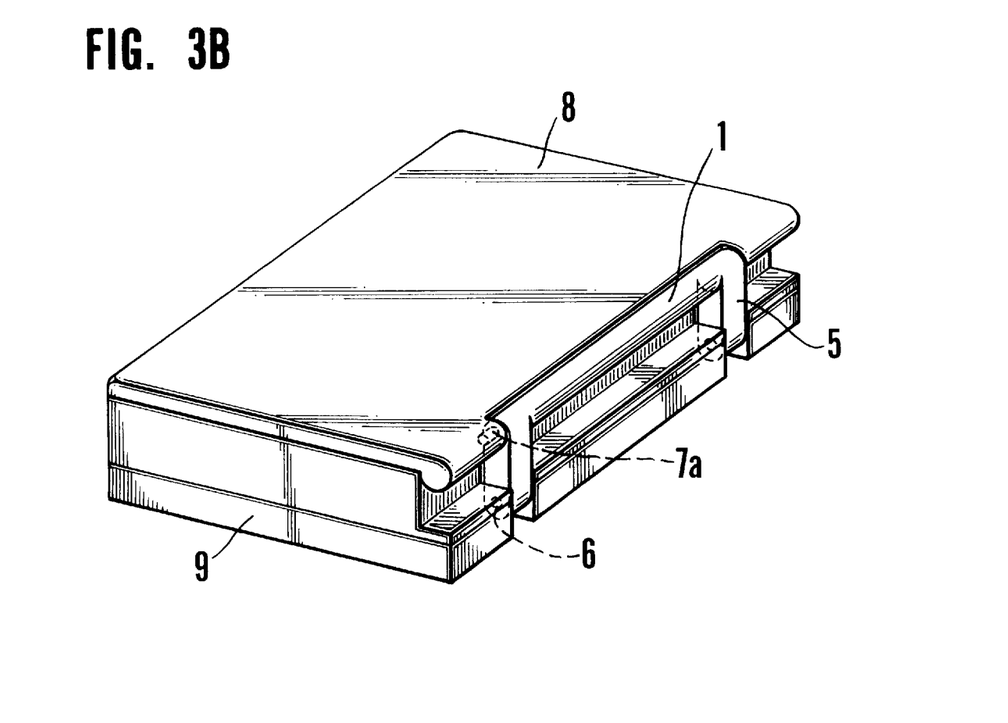
FIG. 3B is a perspective view seen in the direction of the rear portion when the protection cover is closed.

The first embodiment according to the present invention will be described in connection with FIGS. 3A and 3B, FIG. 4, FIGS. 5A and 5B, and FIGS. 6A and 6B. Referring to FIGS. 3A and 3B, a protection cover 8 for protecting a tablet type display 12, and a case 9 as the main body of a portable type electronic equipment are connected to each other with a hinge structure as the first embodiment of the present invention. FIG. 3A shows a state wherein the protection cover 8 is open, and FIG. 3B shows a state wherein the protection cover 8 is closed.

Figure 4:
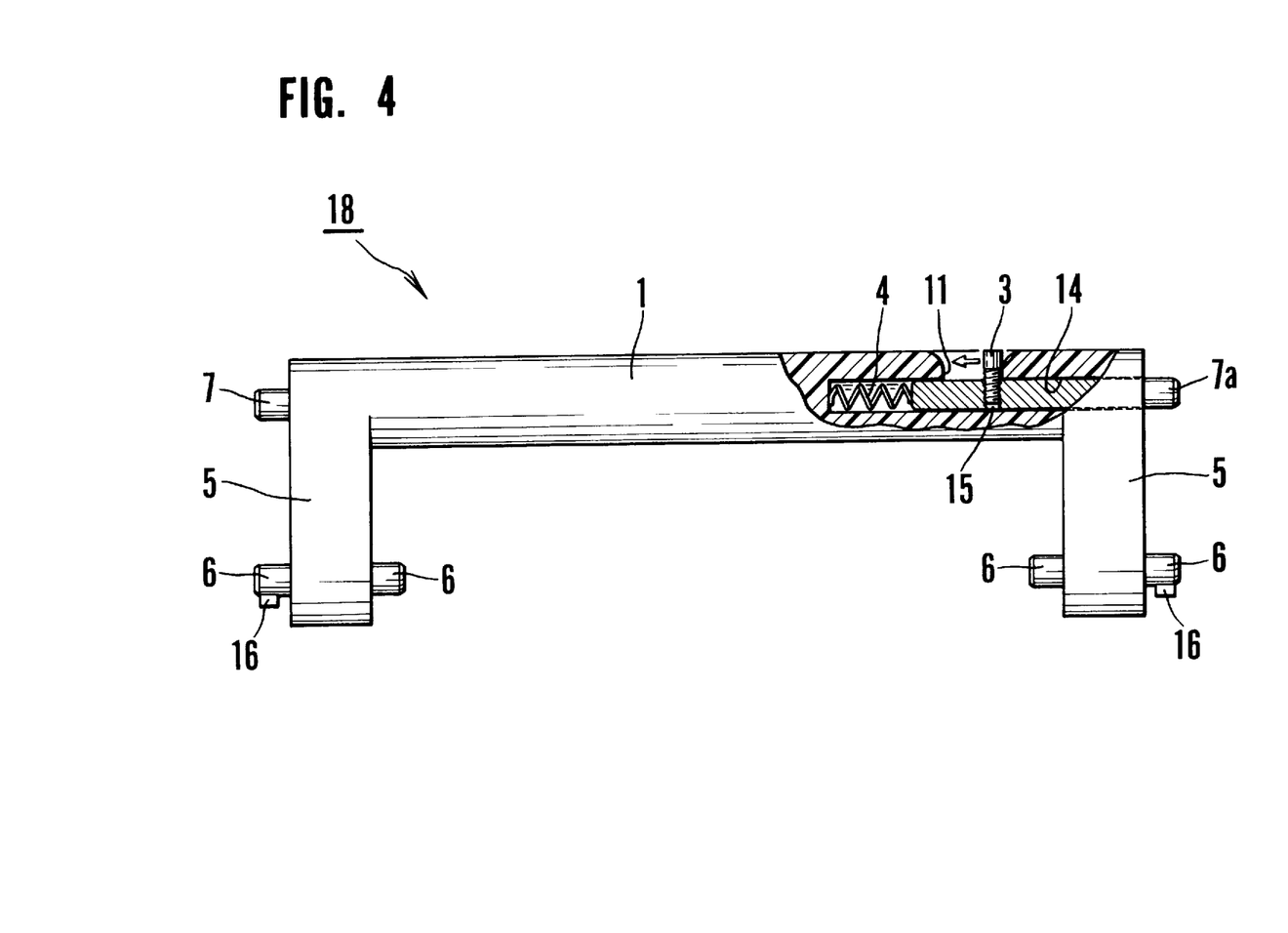
FIG. 4 is a front view showing an embodiment of the present invention.

As is apparent from FIG. 4, in the structure of a hinge portion 18 of the first embodiment, a substantially cylindrical trunk portion 1 having a predetermined length is formed, and a pair of joint portions 5 are integrally formed on the two ends of the trunk portion 1, thereby constituting the hinge main body. The pair of joint portions 5 project from the two ends of the trunk portion 1 for a predetermined length in one direction perpendicular to the axis of the trunk portion 1, so that the joint portions 5 and the trunk portion 1 form a bracket. First shaft projections 7 are formed on the proximal-side end faces, near the trunk portion 1, of the joint portions 5 of the hinge main body to project for a predetermined length in the axial direction of the trunk portion 1 so as to fit in the predetermined portions of the protection cover 8 of the portable type electronic equipment. Second shaft projections 6 are formed on the distal-side end faces of the joint portions 5 to project for a predetermined length in a direction parallel to the axis direction of the trunk portion 1 so as to fit in the predetermined portions of the case 9 of the portable type electronic equipment.

As shown in FIG. 4, concerning at least one shaft projection 7 formed on the proximal-side end face of the joint portion 5, a circular hole 14 having a predetermined depth in the axial direction of the cylindrical portion, and a notch 11 extending to reach the inner wall of the circular hole 14 are formed near one end of the trunk portion 1 having a predetermined length. A spring 4 is inserted in the circular hole 14, and thereafter a cylindrical slide shaft projection 7a having a through hole 15 in its side surface is inserted in the circular hole 14. The slide shaft projection 7a has such a length that, when it is slid for a predetermined distance to the left (indicated by an arrow) in FIG. 4, its projecting amount from the right end of the corresponding joint portion 5 becomes 0. When the slide shaft projection 7a is slid in the direction of an arrow to decrease the projection amount to 0, the protection cover 8 can be mounted on/detached from the case 9.

When a knob 3 is pressed into and fixed in the through hole 15 through the notch 11 to project upward for a predetermined length, the slide shaft projection 7a constantly biased to the right in FIG. 4 by the spring 4 serves as a stopper as the knob 3 abuts against the outer circumferential end of the notch 11. Therefore, the slide shaft projection 7a will not drop from the circular hole 14.

The projection amount of the slide shaft projection 7a from the right end of the trunk portion 1 can be freely changed by operating the knob 3.

Figure 5A:
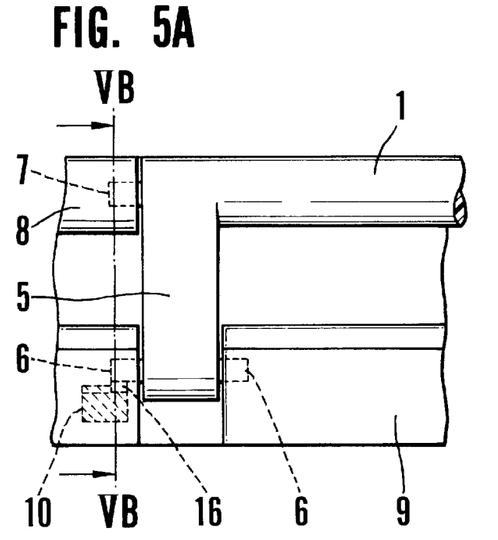
FIG. 5A is a partial front view showing a connection state between the trunk portion including the joint portion and the portable type electronic equipment.
Figure 5B:
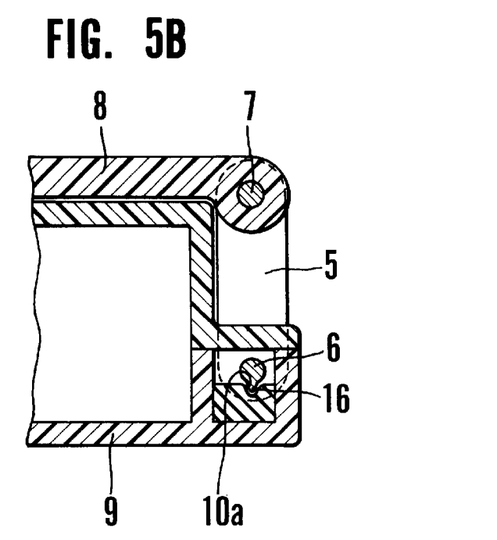
FIG. 5B is a partially sectional view taken along the line VB—VB of FIG. 5A.

In the hinge portion 18, when the protection cover 8 is built into the case 9 in the closed state, projecting portions 16 directed radially downward are formed at least on the two outer shaft projections 6, as shown in FIGS. 5A and 5B. The projecting portions 16 coincide with notches 10a formed in elastic members 10 accommodated in the case 9.

When opening the protection cover 8, the hinge portion 18 pivots about the shaft projections 6 as the center such that the projecting portions 16 ride over the notches 10a while elastically deforming the elastic members 10. For this reason, the hinge portion 18 accepts a constant resistance. The positional relationship between the projecting portions 16 and the notches 10a of the elastic members 10, and the numbers of projecting portions 16 and notches 10a may be freely set.

Figure 6A:
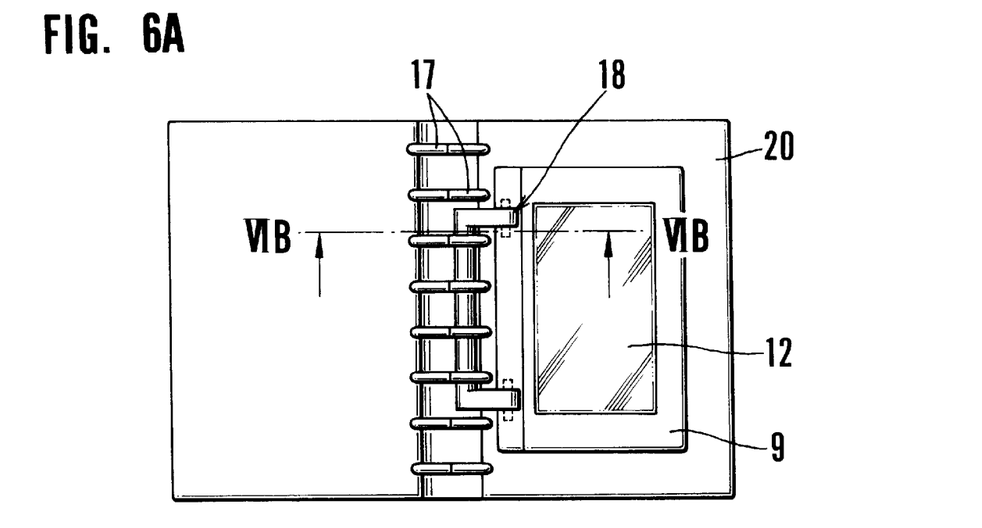
FIG. 6A is a plan view showing a state wherein a portable type electronic equipment having the hinge structure of the present invention is joined with a notebook having binder pawls.
Figure 6B:
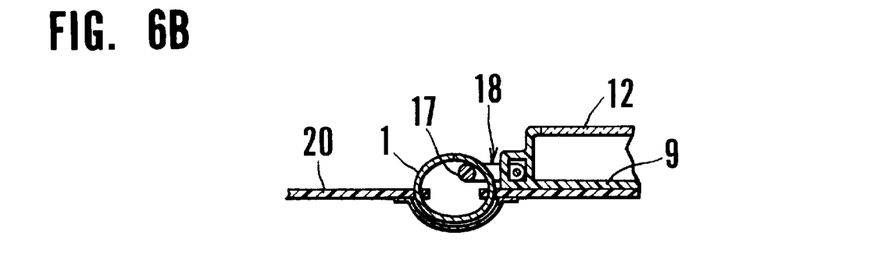
FIG. 6B is a partial sectional view taken along the line VIB—VIB of FIG. 6A.

FIGS. 6A and 6B show a state wherein a portable type electronic equipment having the hinge structure of the present invention is joined with a notebook (e.g., a system notebook) 20 having binder pawls 17, in which FIG. 6A is a plan view, and FIG. 6B is a sectional view taken along the line VIB—VIB of FIG. 6A.

In this case, the trunk portion 1, and the joint portions 5 formed on the two ends of the trunk portion 1 must have dimensions as follows. More specifically, the length of the trunk portion 1 must fit with the length across the plurality of binder pawls, its outer diameter must fit with the inner size of the binder pawls 17, and the width of the joint portions 5 must fit with the size between adjacent binder pawls.

Figure 7A:
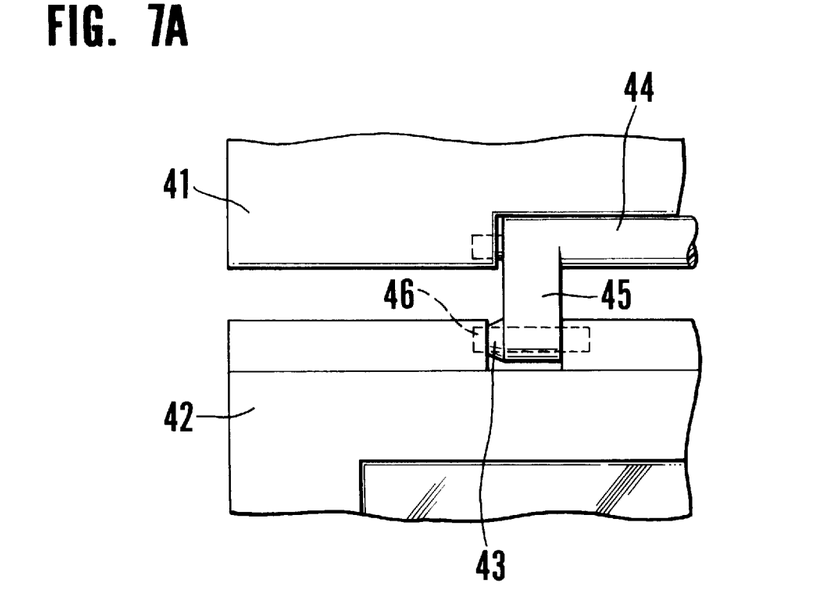
FIG. 7A is a partial front view of the same.
Figure 7B:
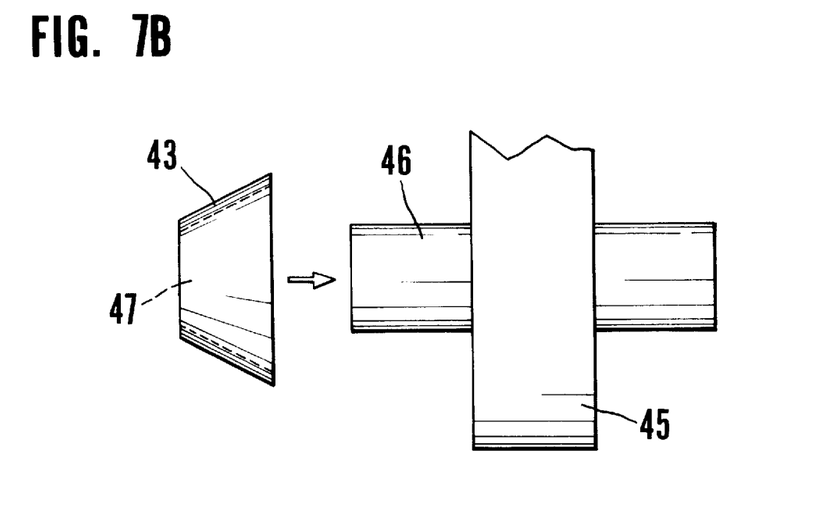
FIG. 7B is a partial enlarged exploded view of the same.

FIG. 7A is a partial front view of a hinge structure according to the second embodiment of the present invention, and FIG. 7B is a partial detailed view of FIG. 7A.

Referring to FIGS. 7A and 7B, in this second embodiment, a substantially dish-shaped elastic member 43 having a through hole 47 having a diameter larger than the outer diameter of the shaft projection 46 is built on at least one shaft projection 46 through its through hole 47 (see FIG. 7B). Thereafter, the hinge is built into a case 42. Since the elastic member 43 is elastically deformed, a hinge portion 44 is always biased to the right in FIG. 7A.

What claim is:

1. A hinge structure for a portable type electronic equipment, for connecting a protection cover which protects a tablet type display and a substantially rectangular parallelepiped case which serves as an equipment main body with each other, comprising a substantially cylindrical trunk portion having a predetermined length, a pair of joint portions integrally formed on two ends of said trunk portion and projecting from said two ends of said trunk portion for a predetermined length in one direction perpendicular to an axis of said trunk portion so as to form a bracket together with said trunk portion, a pair of first shaft projections projecting from proximal-side end faces, near said trunk portion, of said pair of joint portions for a predetermined length outward in an axial direction of said trunk portion so as to fit in said protection cover, and two pairs of second shaft projections projecting from distal-side end faces of said pair of joint portions for a predetermined length in a direction parallel to the axis of said trunk portion so as to fit in said case.

2. A hinge structure according to claim 1, wherein at least one of said pair of first shaft projections that fit in said protection cover is slidable in an axial direction thereof to be able to project/retract, thereby enabling said protection cover to be mounted on/detached from said case.

3. A hinge structure according to claim 1, wherein at least two outer ones of said two pairs of second shaft projections have projecting portions integrally projecting radially downward.

4. A hinge structure according to claim 1, wherein said bracket is arranged and constructed for being joined with a notebook having binder pawls.

5. A combination of an electronic device, a protective cover for said device, a notebook for said device, and a hinge for selectively joining said device to one of said protective cover and said notebook;

said notebook comprising plural spaced apart and selectively opened pairs of binder pawls;

said hinge comprising, a generally cylindrical trunk having a diameter so that said trunk fits between said pawls when said pairs of pawls are opened, two joint portions, each being integral with a different end of said trunk and extending perpendicular to an axis of said trunk, said trunk having a length so that each of said joint portions extends between adjacent ones of said spaced apart pairs of pawls when said device is joined to said notebook, a pair of first shafts projecting from the ends of said trunk parallel with the axis of said trunk, and two pairs of second shafts that are parallel to the axis of said trunk, each said pair of second shafts projecting from opposing end faces of a different one of said two joint portions;

said protective cover comprising first holes for receiving said first shafts when said device is joined to said protective cover; and said device comprising two pairs of second holes for receiving said second shafts to attach said hinge to said device.

6. The combination of claim 5, wherein at least one of said first shafts is axially slidable within said trunk for releasing said hinge from the one of the protective cover and the notebook to which it is joined.

7. The combination of claim 5, wherein said device comprises a notched elastic member adjacent one of said second holes, and wherein one of said second shafts comprises a radial projection for engaging said notched elastic member for holding said hinge in a predetermined open position.

* * * * *